US012762111B2

(12) United States Patent
Jha et al.

(10) Patent No.: US 12,762,111 B2
(45) Date of Patent: Oct. 13, 2026

(54) MECHANISMS FOR HANDLING WRITES IN DISTRIBUTED DATABASE SYSTEM

(71) Applicant: Salesforce, Inc., San Francisco, CA (US)

(72) Inventors: Atul Jha, Fremont, CA (US); Terry Chong, Pleasanton, CA (US); Jameison Bear Martin, Oakland, CA (US); Atish Agrawal, Seattle, WA (US); Benjamin Busjaeger, San Carlos, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 19/041,683

(22) Filed: Jan. 30, 2025

(65) Prior Publication Data

US 2026/0220124 A1 Jul. 30, 2026

(51) Int. Cl.
*G06F 16/23* (2019.01)
*G06F 16/27* (2019.01)

(52) U.S. Cl.
CPC .......... *G06F 16/2379* (2019.01); *G06F 16/27* (2019.01)

(58) Field of Classification Search
None
See application file for complete search history.

(56) References Cited

U.S. PATENT DOCUMENTS 10,719,533 B2 7/2020 Busjaeger et al.
10,872,066 B2 12/2020 Martin et al.
10,924,438 B2 2/2021 Kwong et al.
11,650,985 B2 5/2023 Busjaeger et al.
11,816,073 B1 * 11/2023 Chakrabarti .......... G06F 16/252
12,182,167 B1 * 12/2024 Mazzola Paluska . G06F 16/273
2006/0218210 A1 * 9/2006 Sarma .................. G06F 16/273
2011/0178984 A1 * 7/2011 Talius ..................... G06F 16/27 707/634
2018/0210713 A1 7/2018 Busjaeger
2019/0347352 A1 * 11/2019 Gochkov ............ H04L 67/1034
2020/0250172 A1 8/2020 Busjaeger et al.
2021/0240674 A1 8/2021 Agrawal et al.
2022/0188317 A1 6/2022 Fanghaenel et al.
2022/0245094 A1 8/2022 Jujjuri et al.
2023/0143636 A1 5/2023 Busjaeger et al.

* cited by examiner

*Primary Examiner* — Kavita Stanley
*Assistant Examiner* — Cao D Vuong
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed for processing record writes in a database system having a log owner and one or more log tailers. The log owner maintains a transaction log, and the log tailers replay the transaction log to recreate a state of the log owner. A log tailer may receive a write request to perform a record write operation to write a base record to a database as part of a database transaction. The log tailer may determine additional records to write as a result of having to write the base record. The log tailer buffers the base record and additional records in a memory buffer and issues them as a single batch to the log owner to update the transaction log. The log owner may update the transaction log and return a response to the log tailer that indicates whether the log owner successfully updated the transaction log.

17 Claims, 7 Drawing Sheets

MECHANISMS FOR HANDLING WRITES IN DISTRIBUTED DATABASE SYSTEM

BACKGROUND

Technical Field

This disclosure relates generally to database systems and, more specifically, to various mechanisms for buffering and batching database records in database transaction processing.

Description of the Related Art

Enterprises routinely implement database management systems (or, simply "database systems") that enable users to store data in an organized manner that can be efficiently accessed and manipulated. A database system may implement any of various types of databases to store data, such as a relational database, a non-relational database, etc. During operation, a database system receives requests from users via client applications or from other systems, such as other database systems, to perform database transactions on the data that is stored in a database of the database system. A database transaction can comprise various database statements defining operations that involve reading data from the database and/or writing data to the database. For instance, the database system may receive a structured query language (SQL) update statement to update an existing record of a database table of the database.

DETAILED DESCRIPTION

Figure 1:
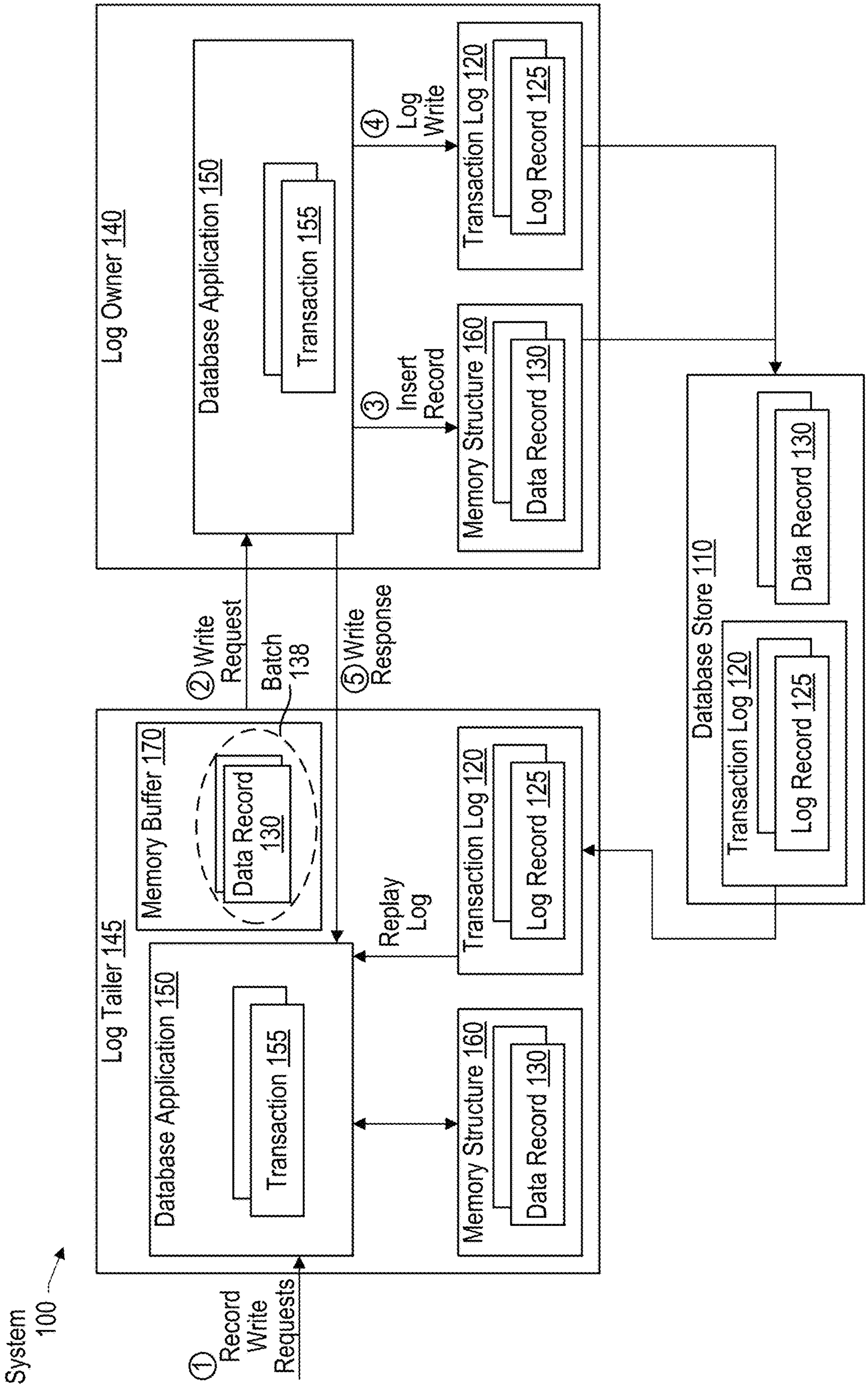
FIG. 1 is a block diagram illustrating one embodiment of a system that comprises a log owner and a log tailer.

Many database systems implement a leader-follower architecture in which a cluster of database nodes includes a leader node (herein referred to as the "log owner" or "primary node") and one or more follower nodes (herein referred to as the "log tailers," "secondary nodes," or "replica nodes"). In this architecture, the log owner maintains a transaction log that describes database operations (e.g., inserts, updates, and deletes) performed within the database system. As such, the log owner is typically responsible for processing write operations and maintaining the latest, authoritative version of the data. The log owner may insert data records into a local memory structure and separately store log records in the transaction log. As an example, if the log owner executes a SQL insert statement, then it inserts the specified data record(s) into the local memory structure and further stores, in the transaction log, a log record that identifies the execution of that SQL insert statement.

Log tailers are synchronized with the log owner to reflect its current state. In particular, the log tailers read the transaction log (particularly, the most recent log records (i.e., "tail" the log)) and replay operations that were performed by the log owner in order to reflect its current state. By tailing the log, these log tailers can process read requests and, if need be, fail over to become the new log owner if the current log owner crashes or otherwise becomes unavailable. Since the log tailers are allowed to process read requests and only the log owner is allowed to process write requests, the conventional leader-follower architecture can scale well for reads but not writes. In order to scale writes, in various embodiments described below, log tailers are permitted to process write requests (e.g., inserts, updates, etc.) that involve record writes.

A record write can involve writing multiple database records. As an example, a record write to insert a new row in a table can involve writing a base record (the row) and one or more index records that include updates to indexes built on the table, where those updates reflect the insertion of the new row into the table. Writing these records can involve multiple interactions between the log tailer and the log owner. For each record being written, the log tailer sends a request with the record to the log owner, and the log owner inserts the record in a local memory structure, logs the write in the transaction log, and returns a response. The round trip between sending the request and receiving the response might take hundreds of microseconds. The next record is not sent until the response is received for the previous record. Accordingly, a database transaction involving thousands of record writes, each of which may involve writing multiple records and thus involve multiple round trips between the log tailer and the log owner, can take an exorbitant amount of time to complete. Consequently, service-level agreements may not be met. The present disclosure addresses, among other things, the problem of a record write taking a significant amount of time to perform due to overhead cost (e.g., time) involved in multiple round trips between the log tailer and the log owner.

In various embodiments described below, a database system comprises a log owner and one or more log tailers. The log owner maintains a transaction log and the log tailers replay the transaction log. A log tailer may receive a write request to perform a record write (e.g., a SQL insert) that involves writing a base record to a database as a part of a database transaction. The base record may correspond to a row being inserted into a table. The log tailer may determine additional records to write as a result of having to write the base record—the additional records may be index records that update one or more indexes to reflect the insertion of the base record. In various embodiments, the log tailer buffers the base record along with the additional records in a memory buffer and issues them together as a single batch to the log owner. The batch may be issued in a single Remote Procedure Call (RPC). The log owner may insert the records into a local memory structure, log the writes in the transaction log, and return a response indicating whether the transaction log was successfully updated. Upon receiving a success response, the log tailer may perform further operations, such as duplicating checking or inserting the records into its own local memory structure.

Writing records may involve a collaborative interaction between an executor layer and an access layer executed at the log tailer. In various embodiments, the executor layer performs the processing needed to determine what records to write (e.g., a base record and any additional records) and communicates the records to the access layer one at a time. The access layer may detect when a record write is starting, buffer the received records in a memory buffer (as they are received one at a time), and then send them to the log owner as a single batch in response to detecting that the record write is finished by the executor layer.

These techniques may be advantageous over prior approaches as these techniques can reduce communication overhead, improve write efficiency, and ensure consistency between a log tailer and the log owner. That is, by enabling the log tailer to locally buffer records involved in a record write and issue them as a batch to the log owner, the number of round trips between the log tailer and the log owner is reduced, and consequently, the communication overhead is reduced. As a result, the latency experienced by users of the database system is reduced. Thus, the disclosed techniques provide a technical improvement to database technology. Moreover, since less resources and time is spent on a record write, the number of record writes performed within a given period may be increased, improving the overall scalability of write operations. Also, the memory buffer may be reused across multiple record writes within a transaction and thus the disclosed techniques may optimize memory utilization and ensure sufficient resources for processing other transactions. Collectively, these improvements enhance the performance and reliability of database systems operating in a leader-follower architecture. Furthermore, some database systems forward the whole SQL DML statement from the log tailers to the log owner to execute. One benefit of RPC'ing individual, low-level, batched write operations is that high-level statement execution (SQL parsing, analyzing, planning, caching, etc.) can be offloaded to the log tailers. In addition, reads for the records are much easier to cache or filter, so in many cases SQL queries can be executed locally. As a result, compute resources on the log owner are freed up, which allows scaling the database architecture much further.

FIG. 1 is a block diagram of one embodiment of a system 100 that includes a log owner 140 and a log tailer 145. System 100 comprises a set of components that may be implemented via hardware or a combination of hardware and software. In the illustrated embodiment, system 100 includes a database store 110, log owner 140, and log tailer 145. As shown, log owner 140 and log tailer 145 each include an instance of a database application 150 (that executes transactions 155), an instance of a transaction log 120 (that includes log records 125), and an instance of a memory structure 160 (that includes data records 130). Also as shown, database store 110 includes an instance of transaction log 120 and data records 130, and log tailer 145 includes a memory buffer 170 that stores data records 130. The illustrated embodiment may be implemented differently than shown. As an example, system 100 can include multiple log tailers 145 that form a database cluster with log owner 140. Accordingly, it is noted that the number of components of system 100 (and the number of subcomponents for those shown in FIG. 1) may vary between embodiments. Thus, there can be more or fewer of each component or subcomponent than the number shown in FIG. 1.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, stores, and other entities that are associated with system 100. In various embodiments, system 100 is implemented using a cloud infrastructure that is provided by a cloud provider. Thus, database store 110, log owner 140, and log tailer 145 may use the available cloud resources of the cloud infrastructure (e.g., computing resources, storage resources, etc.) in order to facilitate their operation. For example, software for implementing database application 150 can be stored on a non-transitory computer readable storage medium of server-based hardware that is included in a datacenter of the cloud provider and executed in a virtual machine that is hosted on the server-based hardware. Various components of system 100 may be implemented without the assistance of a virtual machine or other deployment technologies such as containerization. In some embodiments, system 100 is implemented using a local or private infrastructure as opposed to a public cloud.

Database store 110, in various embodiments, includes a collection of data organized in a manner that allows for access, storage, and manipulation of the data. Database store 110 may include supporting software (e.g., storage nodes) that enables database nodes (e.g., log owner 140 and log tailer 145) to carry out the operations (e.g., accessing, storing, etc.) on data that is stored at database store 110. In various embodiments, database store 110 is implemented using a single or multiple storage devices connected together on a network (e.g., a storage attached network (SAN)) and configured to redundantly store data in order to prevent data loss. These storage devices may store data persistently and thus database store 110 may serve as persistent storage for system 100. Further, as discussed, components of system 100 may use the available cloud resources of a cloud infrastructure and thus database store 110 may be a storage service provided by a cloud provider (e.g., Amazon S3®). Also, the data written to database store 110 by one database node (e.g., log owner 140) may be accessible to other database nodes (e.g., log tailer 145) in a multi-node configuration (e.g., a node cluster or a system having multiple node clusters spread across different zones provided by a cloud provider).

In various embodiments, database store 110 stores at least two types of files: data files and log files. A data file may comprise the actual data and may be append-only such that new data records 130 are appended to the data file until its size reaches a threshold and another data file is created. A data record 130, in various embodiments, comprises data with a database key that is usable to look up that data record 130. For example, a data record 130 may correspond to a row in a database table, where the record specifies values for attributes of the table. A log file may comprise log records 125 that describe database modifications (e.g., record insertions) resulting from executing database transactions 155. As with data files, log files may be append-only and continuously receive appends as transactions 155 do work.

Transaction log 120, in various embodiments, is a set of log files having log records 125 that collectively identify a state of the database system that is implemented by system 100. Transaction log 120 may therefore record every change (inserts, updates, deletes) that is made to the database stored at database store 110. By reading transaction log 120, a database node (e.g., log tailer 145) may determine an ordering in which database operations were performed in system 100, including an ordering in which transactions 155 committed. Data files and log files, in various embodiments, are assigned file IDs that can be used to locate them. Log owner 140 and log tailer 145 may access data records 130 and log records 125 from database store 110 by issuing access requests with file IDs to storage nodes that implement database store 110.

Log owner 140 and log tailer 145, in various embodiments, are database nodes that can facilitate database services, such as data retrieval and/or data storage. In various embodiments, database nodes are software, but in other embodiments, they encompasses both hardware and software. A database node may operate in at least two different modes: a primary or log owner mode and a secondary or log tailer mode. Thus, in the illustrated embodiment, log owner 140 is a database node that operates in the log owner mode while log tailer 145 is a database node that operates in the log tailer mode. If log owner 140 crashes or otherwise becomes unavailable, then the database node that operates as log tailer 145 may transition to the log owner mode and therefore operate as the next log owner 140 as a result.

Log owner 140, in various embodiments, is responsible for generating and maintaining transaction log 120. Log owner 140 may thus manage the persistence of log records 125 (e.g., by storing them at database store 110) and ensure that they are available for other components, such as log tailer 145, to access. Log tailer 145, in various embodiments, reads transaction log 120 (particularly, the most recent log records 125) and replays read log records 125 to recreate the state of the log owner's memory structure 160. As shown in FIG. 1, log tailer 145 can access transaction log 120 from database store 110 (particularly, the most recent log records 125 after log owner 140 has written them out to database store 110), store a local instance of transaction log 120, and replay log records 125 from it. As a result of replaying log records 125, log tailer 145 may be able to return data records 130 from its memory structure 160 as part of processing transactions 155 and, in the event log owner 140 becomes unavailable (e.g., crashes), become the next log owner of transaction log 120.

In various embodiments, log owner 140 and log tailer 145 implement a database system together. This database system may be a relational database system, such as PostgreSQL®. In various embodiments, log owner 140 and log tailer 145 implement a multi-tenant system that allows multiple tenants to each store a respective set of data in database store 110. For example, database store 110 may store a first set of data for a non-profit organization (a first tenant) and a second set of data for a company (a second tenant). In that embodiment, the database system implemented by log owner 140 and log tailer 145 may employ security measures to ensure that one tenant's data is isolated from another's data to prevent one tenant from accessing another tenant's data (without authorization).

Database services of log owner 140 and log tailer 145 may be provided to components within or external to system 100. As an example, log owner 140 may receive database requests from a client application to perform one or more database operations for a database transaction 155. A database transaction 155, in various embodiments, is a logical unit of work (e.g., one or more database statements). For example, processing a database transaction 155 may include executing a SQL select statement to select and return one or more rows from a database table. The contents of a row may be specified in a data record 130 and therefore log owner 140 may return one or more data records 130 (corresponding to the rows) to the client application. The database requests received by log owner 140 and/or log tailer 145 may include a set of database statements expressed using SQL or another query declarative language.

Database application 150, in various embodiments, is software executable to provide a set of database services (e.g., access, manipulate, and/or store data). Thus, database application 150 can receive database statements (e.g., a SQL select statement) as part of executing database transactions 155 and process them. To process a database statement, database application 150 may execute a query plan (also referred to as an "execution plan") that defines a sequence of steps to be executed to implement that database statement. In various embodiments, database application 150 may generate one or more query plans, select one of them based on a scoring mechanism, and execute the selected query plan, all within a single execution flow (e.g., that is triggered by a request to execute a database statement). In some cases, database application 150 may receive a request to generate one or more query plans for a database statement and separately receive a request to execute the database statement with certain values in accordance with one of the query plans. As part of executing a database statement, in various embodiments, database application 150 may generate data records 130 and also log records 125 if executing on log owner 140. Database application 150 may temporarily store data records 130 in its local memory structure 160.

Memory structure 160, in various embodiments, is an in-memory buffer that stores data (e.g., data records 130) in memory (e.g., random access memory) before being written to disk. HBase™ Memstore is one example of memory structure 160. In various embodiments, data records 130 are stored in persistence artifacts (e.g., files) as part of a log-structured merge tree (LSM tree) that organizes them using a level-based scheme. In particular, database application 150 may initially insert data records 130 into memory structure 160. As memory structure 160 becomes full or after certain periods of time, database application 150 may flush data records 130 from its memory structure 160 to database store 110. That is, memory structure 160 may hold recent record versions until enough data has been accumulated to create a new persistence artifact. As a part of flushing those data records 130, database application 150 may write them into a new persistence artifact that is stored in one of the multiple levels (e.g., the top level) of the LSM tree. Over time, those data records 130 may be rewritten into new persistence artifacts stored in lower levels as they are merged down the LSM tree. In various embodiments, when log tailer 145 flushes its memory structure 160, it may evict data records 130 without writing them out to database store 110 because those records may already be stored at database store 110 as a result of a flush by log owner 140.

All data records 130 that are generated as a result of data manipulation language (DML) statements may be inserted into log owner 140's memory structure 160, which may implement logic to manage locks and insertions, updates, and deletions. Accordingly, log owner 140 may populate its memory structure 160 based on its own work and the work done by log tailer 145 when executing database transactions 155. Log tailer 145 may populate its memory structure 160 when replaying transactions 155 recorded in transaction log 120—in some embodiments, log tailer 145 can insert, before replaying transaction log 120, data records 130 into its memory structure 160 after receiving a write response from log owner 140 indicating that the database operations associated with those records have been logged.

In various embodiments, log tailer 145 processes both read and write transactions 155, where a write transaction can involve both reading and writing data records 130. Accordingly, log tailer 145 may process a write transaction 155 involving at least a write operation/a record write (e.g., a SQL insert, a SQL update, etc.) to write a data record 130. Log tailer 145 may initially receive a set of record write requests (as shown) for such a write transaction 155. When processing a write operation/a record write, log tailer 145, in various embodiments, determines what data records 130 to write for that record write. In many cases, writing a data record 130 for a database table may also involve writing one or more additional data records 130. As an example, writing a data record 130 that represents a new purchase of an item may also involve updating an inventory of the item. As another example, there may be one or more indexes built on a database table. Thus, inserting a base data record 130 into the database table may involve updating the indexes, particularly adding entries to them that reflect the base data record 130, which results in one or more additional records 130. The base data record 130 and the one or more additional records 130 may be temporarily buffered in memory buffer 170.

Memory buffer 170, in various embodiments, is a memory space allocated to store data records 130 that are being issued to log owner 140. Memory buffer 170 may be allocated and deallocated per record write, per database statement, or per database transaction 155. In cases where memory buffer 170 is allocated per database statement or per database transaction 155, memory buffer 170 may be used to store data record 130 for multiple record writes. In various embodiments, the memory size that is initially allocated for memory buffer 170 is the same for all record writes/database statements/database transactions; however, the memory size may be increased in response to memory buffer 170 becoming full. In other embodiments, the memory size is based on whether buffer 170 being allocated for a record write, a database statement, or a database transaction and thus the initially-allocated memory size may vary.

In various embodiments, memory buffer 170 is distinct from memory structure 160—it is different from memory structure 160 in multiple ways. As an example, memory structure 160 may implement logic to manage locks and check for conflicts between records 130 while memory buffer 170 does not implement this logic. Memory buffer 170 may also be deallocated after a record write/database statement/database transaction while memory structure 160 may persist across multiple transactions. Transactions 155 may access committed data records 130 of other transactions 155 from memory structure 160 while the transactions 155 may not access data records 130 of other transactions 155 from memory buffer 170.

As log tailer 145 processes a record write and begins to determine data records 130 to write, log tailer 145 may insert the data records 130 into memory buffer 170. Memory buffer 170 may store them for the duration of the record write. After log tailer 145 determines all data records 130 to write for the record write, in various embodiments, log tailer 145 issues a write request (as shown) to log owner 140 to insert them into its memory structure 160 and log the writes to transaction log 120. In particular, all the data records 130 associated with the record write may be organized into a batch 138 and sent in a single write request (e.g., an RPC) to log owner 140. By buffering the data records 130 associated with the record write and grouping them into a batch 138 instead of sending them individually, the number of RPCs from log tailer 145 to log owner 140 is reduced, resulting in more efficient communication and minimized overhead. In some embodiments, log tailer 145 buffers multiple batches 138 of records 130 for multiple record writes at the same time and issues a single write request to log owner 140 that includes two or more of those batches 138

Before inserting the received data records 130 into its memory structure 160, log owner 140 may first determine whether the record write conflicts with other record writes (e.g., those performed by log owner 140 or other log trailers 145). If no conflict exists, then log owner 140 inserts the data records 130 into its memory structure 160 and logs the writes to transaction log 120 in log records 125. While inserting the data records 130 is illustrated in FIG. 1 as occurring before logging the writes to transaction log 120, in some embodiments, log owner 140 logs the writes in transaction log 120 first and then inserts the data records 130 into its memory structure 160. Once the data records 130 have been inserted and the writes have been logged, in various embodiments, log owner 140 returns a success write response to log tailer 145. But if log owner 140 was not able to insert the data records 130 or log the writes, then log owner 140 may return a write response indicating a failure. After confirming the success of a record write, log tailer 145 may flush data records 130 from buffer memory 170 to maintain resource availability for subsequent record writes.

Figure 2:
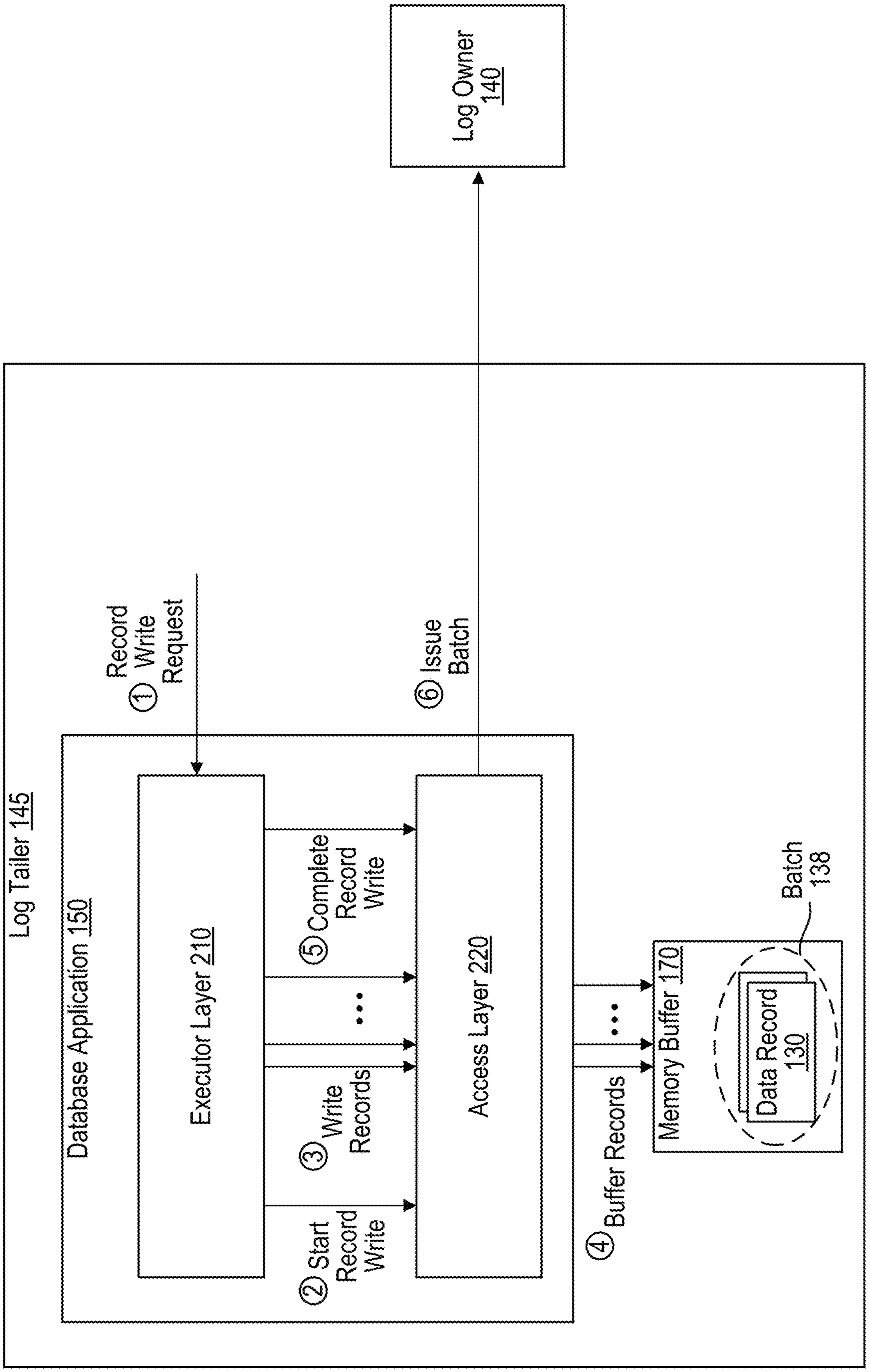
FIG. 2 is a block diagram illustrating one embodiment of an executor layer and an access layer implemented by a database application.

FIG. 2 is a block diagram illustrating one embodiment of an executor layer 210 and an access layer 220 of database application 150. In the illustrated embodiment, there is log owner 140 and log tailer 145. As shown, log tailer 145 includes database application 150 and memory buffer 170. As further shown, database application 150 includes executor layer 210 and access layer 220. In some embodiments, database application 150 does not implement separate layers (as shown) that communicate with each other via an application programming interface (API), as discussed below.

Executor layer 210, in various embodiments, is software that is executable to process a record write (e.g., a SQL insert) and communicate with access layer 220 to write data records 130 for the record write through issuing them to log owner 140. Accordingly, executor layer 210 may determine the base record and any additional records (e.g., index records) to write for a record write. As shown, in step 1, executor layer 210 receives a record write request, which may include a database statement of a transaction 155. The request may instruct executor layer 210 to write a data record 130 to a table (e.g., insert, update, or delete a row of the table, where deletes may result in tombstone records that mark the deletion of records 130 associated with a certain database key). In the case of updating or deleting a row of a table, executor layer 210 may access the latest data record 130 of that row (e.g., from log tailer 145's memory structure 160, database store 110, or log owner 140) and generate a data record 130 based on that latest version. Executor layer 210 may then instruct access layer 220 to issue the data record 130 to log owner 140.

In various embodiments, executor layer 210 and access layer 220 communicate via an API. The API may support a start record write call, an issue record call, and a complete record write call. In various embodiments, the start record write call is used to indicate to access layer 220 that executor layer 210 has started a record write and the complete record write call is used to indicate to access layer 220 that executor layer 210 has completed the record write. Based on these two calls, access layer 220 may determine what data records 130 to issue to log owner 140 as a batch 138 and when to issue that batch 138. In various embodiments, the issue record call is used by executor layer 210 to provide a data record 130 to access layer 220 for sending to log owner 140. In some embodiments, instead of providing a data record 130 to access layer 220, executor layer 210 may provide values for the data record 130 and access layer 220 may generate the data record 130 based on those values and buffer it in memory buffer 170.

In step 2, executor layer 210 initiates the record write and signals access layer 220 (via a start record write call) to prepare for buffering data records 130 for a record write. This may ensure that access layer 220 is ready to receive and process data records efficiently. In step 3, executor layer 210 provides data records 130 to access layer 220 (via issue record calls) to send to log owner 140. In particular, after generating the requested base data record 130, executor layer 210 may provide the base data record 130 via an issue record call and any additional data records 130 via respective issue record calls. For example, executor layer 210 may determine that one or more indexes need to be updated as a result of inserting a row into a table and thus generate index data records 130. For each index data record 130, executor layer 210 may send that index data record 130 to access layer 220 via an issue record call. For example, if ten data record 130 are being written, then access layer 220 may send them to access layer 220 via ten issue record calls.

In step 4, as data records 130 are received from executor layer 210, access layer 220 buffers them in memory buffer 170 in association with the record write. Access layer 220 may utilize memory buffer 170 to temporarily store data records 130 in preparation for batching the data records 130 (associated with a record write) in a single request to log owner 140. In some embodiments, the batching is hidden from executor layer 210 such that executor layer 210 does not know that access layer 220 is buffering data records 130 instead of individually providing them to log owner 140. That is, executor layer 210 may not be aware of how data records 130 are batched and sent to log owner 140.

In step 5, executor layer 210 signals the completion of the record write process to access layer 220 (via a complete record write call). This step confirms to access layer 220 that all data records 130 for the record write have been transferred from executor layer 210 and buffered in memory buffer 170. Accordingly, access layer 220 may then consolidate the data records 130 into a single batch 138, ready for transmission to log owner 140. That batch 138 might include metadata (e.g., transaction IDs) to streamline processing at log owner 140. In step 5, access layer 220 issues, to log owner 140, the consolidated batch 138, which may be transmitted as a single RPC to minimize communication overhead and ensure efficient processing by log owner 140. Thus, access layer 220 may issue a batch of records in response to receiving an indication (e.g., a complete record write call) from executor layer 210 that the record write is complete.

FIG. 2 illustrates the division of responsibilities between executor layer 210 and access layer 220. As discussed, executor layer 210 may be responsible for processing a write request, determining what data records 130 to write, and initiating their transfer, and access layer 220 may focus on buffering those data records 130 and consolidating them into a batch for efficient communication with log owner 140. Together, these two layers enable log tailer 145 to process write operations effectively, such that the writing of a base record and additional records (e.g., index records) are handled seamlessly.

Figure 3:
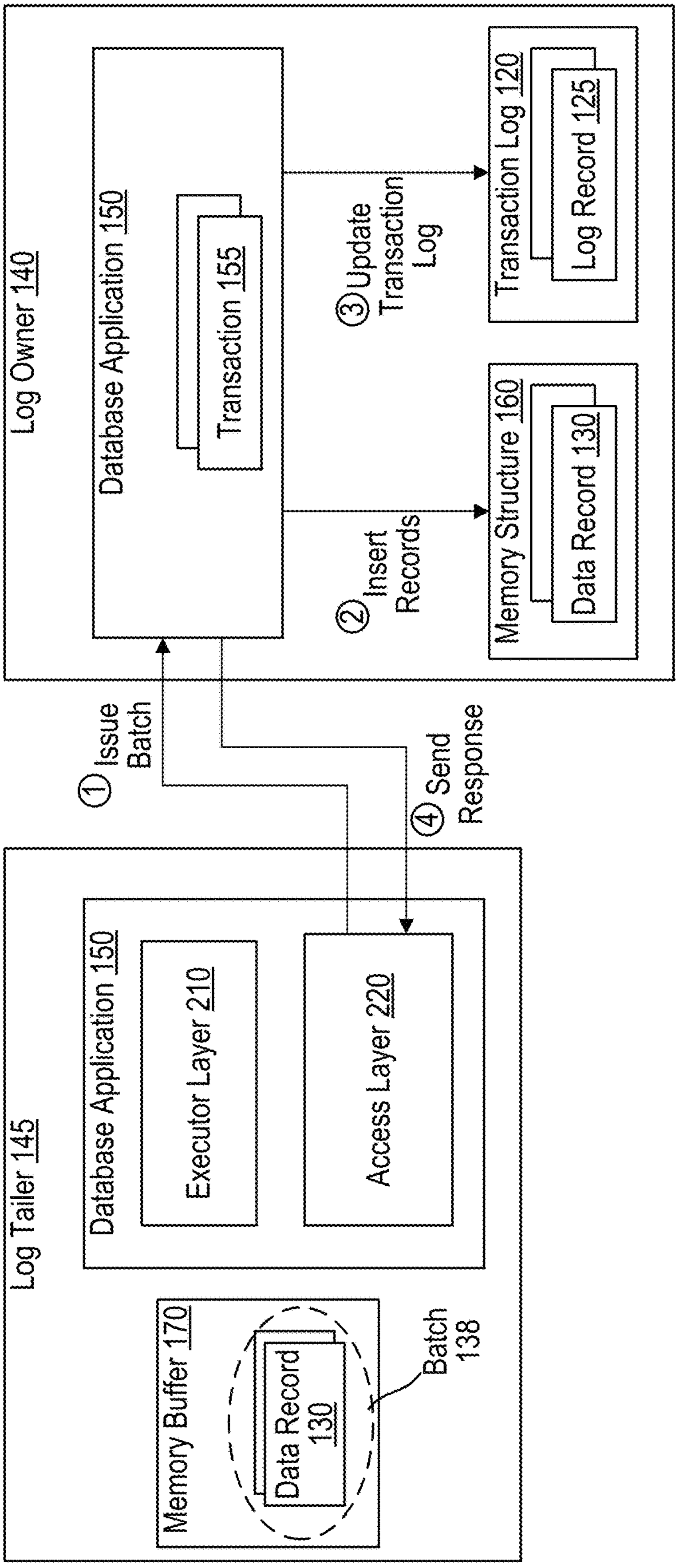
FIG. 3 is a block diagram illustrating one embodiment of an access layer of the log tailer issuing a batch of records to the log owner.

FIG. 3 is a block diagram illustrating one embodiment in which access layer 220 issues a batch 138 to log owner 140 and log owner 140 processes it. In the illustrated embodiment, there is log owner 140 and log tailer 145, each having an instance of database application 150. As further shown, log owner 140 includes memory structure 160 (with data records 130) and transaction log 120 (with log records 125) and log tailer 145 includes memory buffer 170 (with a batch 138 of data records 130). The illustrated embodiment may be implemented differently than shown—e.g., log tailer 145 may include an instance of memory structure 160. Also, log owner 140's database application 150 can include executor layer 210 and access layer 220.

In step 1, access layer 220 of log tailer 145 issues batch 138 to log owner 140 (or more specifically, its database application 150). This step corresponds to step 6 as discussed above with respect to FIG. 2, where access layer 220 issues the consolidated batch to log owner 140. The batch may include both a base record (e.g., the record being inserted by a SQL insert) and one or more additional records (e.g., index records). Memory buffer 170 enables access layer 220 to consolidate those records into a single batch to minimize communication overhead and streamline processing. The batch may also include metadata, such as transaction identifiers, to assist log owner 140 in efficiently processing the batch.

In step 2, database application 150 of log owner 140 inserts the data records 130 from batch 138 into its memory structure 160. As a part of this process, log owner 140 may ensure that those data records 130 do not conflict with writes performed by other database nodes (e.g., log owner 140 and/or other log tailers 145). If a conflict is detected, then log owner 140 may stop inserting data records 130 from batch 138 into its memory structure 160 and return, to log tailer 145, a response indicating the failure.

In step 3, database application 150 of log owner 140 updates transaction log 120 to reflect the changes made during the record write. This step may involve appending log records 125 describing the database modifications (e.g., the insertions of the data records 130 of batch 138 into memory structure 160). In various embodiments, database application 150 performs steps 2 and 3 for a data record 130 before proceeding to the next data record 130 of batch 138. That is, database application 150 may insert a data record 130 into memory structure 160, log the write to transaction log 120, then insert another data record 130 into memory structure 160, log the write in transaction log 120, and so on.

In step 4, database application 150 of log owner 140 sends a response to access layer 220 of log tailer 145. This response may indicate whether the data records 130 of batch 138 were successfully processed by log owner 140 (i.e., inserted into memory structure 160 and logged in transaction log 120). By confirming the success of the operation, the response may enable log tailer 145 to proceed to the next record write, finalize the associated transaction 155, or proceed with other operations. For example, access layer 220 may evict the buffered data records 130 from memory buffer 170 to free up resources or deallocate memory buffer 170 if it was specifically allocated for the record write.

In some embodiments, in response to receiving a success response, log tailer 145 inserts the data record 130 of batch 138 into its memory structure (not shown). In other embodiments, log tailer 145 inserts them into its memory structure as a part of replaying transaction log 120, Once the data records 130 are committed in the memory structure, they may become available to transactions 155 executing at log tailer 145. In response to receiving a failure response, log tailer 145 may rollback a portion or all of a transaction 155. For example, log tailer 145 may roll back the database statement that performed the record write whose data records 130 could not be inserted and logged by log owner 140. Log tailer 145 may then try again to execute the database statement.

Figure 4:
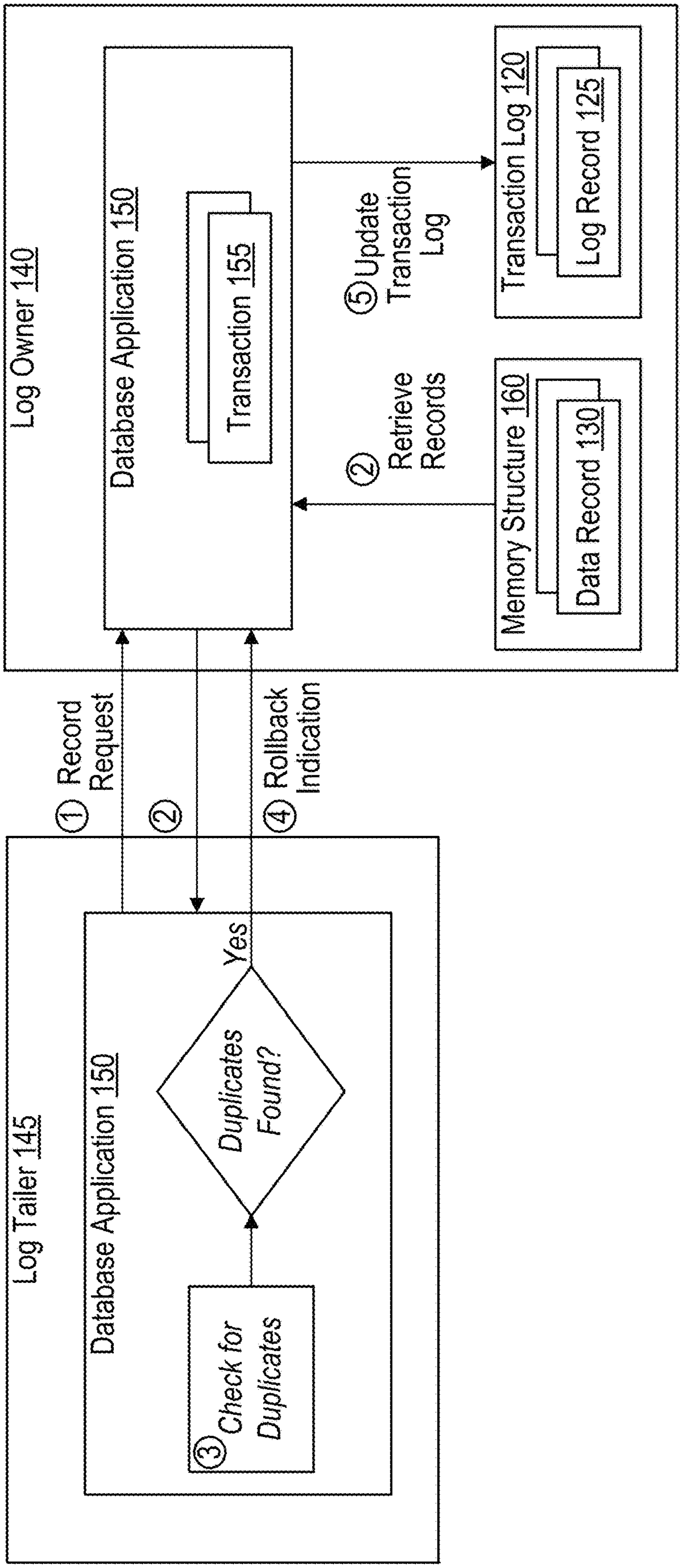
FIG. 4 is a block diagram illustrating one embodiment of detecting duplicates associated with a batch of records issued to the log owner.

FIG. 4 is a block diagram illustrating one embodiment of detecting duplicates associated with a batch 138 of records 130 issued to log owner 140. In the illustrated embodiment, there is log owner 140 and log tailer 145, each including an instance of database application 150. As shown, log owner 140 includes memory structure 160 (with data records 130) and transaction log 120 (with log records 125). The illustrated embodiment may be implemented differently than shown—e.g., log tailer 145 includes an instance of memory structure 160 and transaction log 120.

In some cases, writing a batch 138 of data records 130 can result in certain violations. As an example, a uniqueness constraint may be placed on an index that requires unique values for a particular property of the index—e.g., two index records cannot have the same index key or the same value for a particular column (in the case that the index takes the form of a table). This uniqueness constraint may be violated if a batch 138 of data records 130 includes index records that do not have unique values in view of existing index records. For example, another log tailer 145 might write, via log owner 140, an index record having a particular value that is supposed to be unique. The illustrated log tailer 145, however, may write, via log owner 140, an index record having the same particular value and thus the uniqueness constraint is violated. To detect and address this issue, in various embodiments, log tailer 145 implements a duplicate check process.

In step 1, database application 150 issues a record request to log owner 140 for certain data records 130. This step may be performed in response to database application 150 of log trailer 145 receiving a response from database application 150 of log owner 140 that indicates log owner 140 successfully updated transaction log 120. In various embodiments, the record request requests data records 130 of indexes affected by the associated batch 138 (e.g., indexes that were updated with index records included in batch 138). Log tailer 145 may request that log owner 140 return any index records of the affected indexes that have the same value for a particular column (constrained by a uniqueness constraint) as one of the index records provided in the associated batch 138. In some cases, log tailer 145 may request that log owner 140 return all index records associated with the index keys of the index records provided in the associated batch 138. Accordingly, in step 2, log owner 140 returns a response with the requested records to log tailer 145. The requested records may include records from the associated batch 138 that log owner 140 had successfully logged.

Upon receiving the response, database application 150 of log tailer 145 initiates step 3 that involves checking for duplicates among the records. This process may include comparing records against a predefined set of constraints. For example, if two or more index records share the same index key, then log tailer 145 detects a uniqueness violation since there are duplicates of the index key. As another example, if there is a uniqueness constraint on a particular column of an index and there are multiple index records in the response that have the same value under that column, then log tailer 145 detects a uniqueness violation since there are duplicates of the value. If no duplicates are found, then log tailer 145 may proceed to other operations, such as performing another record write. But if there are duplicates, then, in step 4, log tailer 145 sends a rollback indication to log owner 140 to roll back the record write, or potentially the database statement. This indication may serve to alert log owner 140 of constraint violations, enabling it to take corrective action In step 5, log owner 140 updates transaction log 120 to correct the constraint violation. In various embodiments, log owner 140 inserts a log record 125 that indicates that the database statement associated with the record write is aborted. This may prevent the index records that are being written by log tailer 145 from being committed by log owner 140. This step prevents them from being treated as valid records during subsequent processing.

Figure 5:
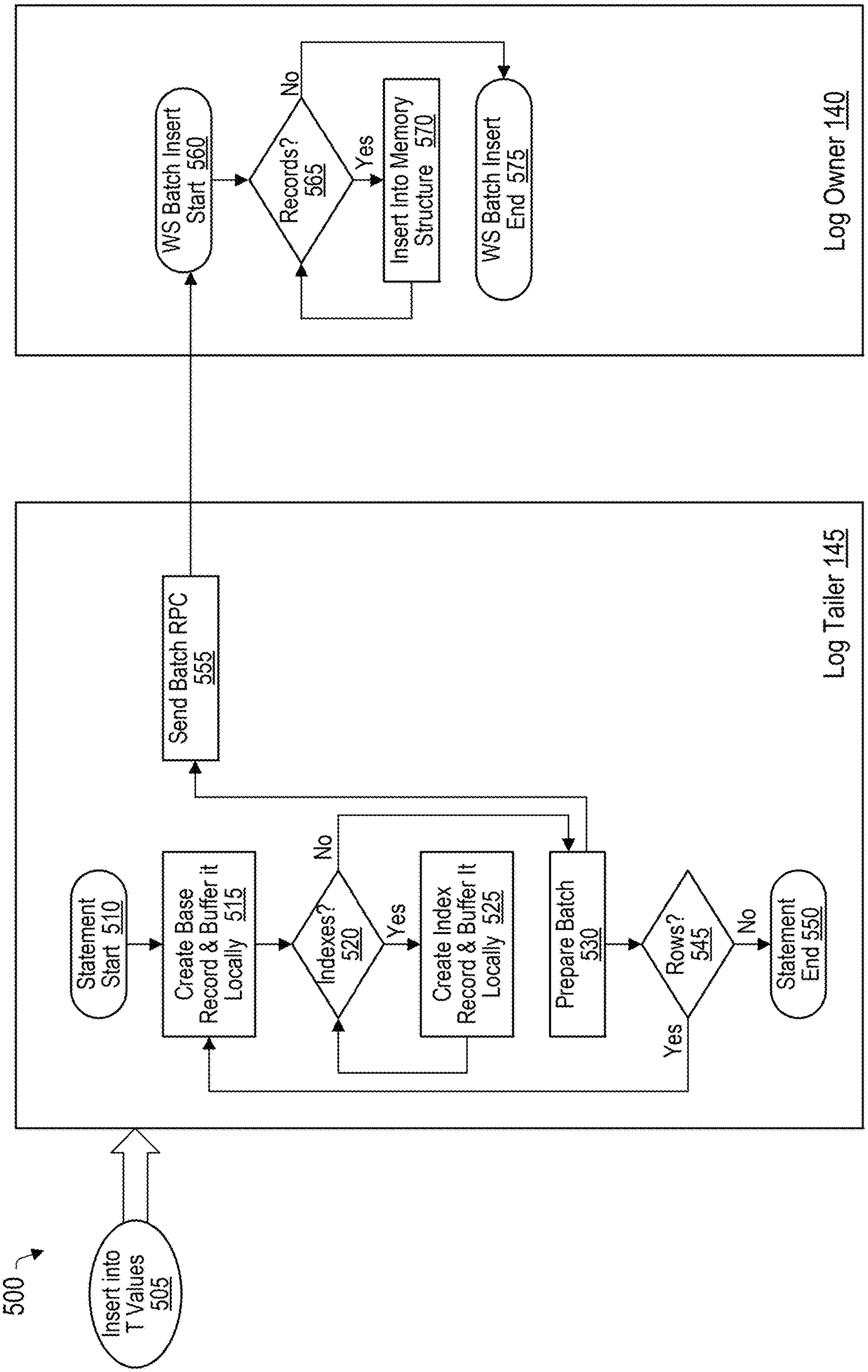
FIG. 5 is a flowchart illustrating one embodiment of batching and processing records of database transactions across the log tailer and the log owner.

FIG. 5 is a flowchart illustrating one embodiment of batching and processing records 130 for database transactions across log owner 140 and log tailer 145. Process 500 highlights the interaction between log owner 140 and log tailer 145, focusing on optimizing the insertion of base records and secondary index records to minimize network round trips (e.g., by sending batches of data records 130) and enhance performance.

At the start of process 500, log tailer 145 receives a database statement to insert into T values (step 505). This database statement initiates a statement processing phase (step 510), during which multiple record writes may be performed. For a record write, a base record 130 is created and buffered locally (step 515) within memory buffer 170. This base record may correspond to a particular row of the table that is being updated by the database statement and may serve as the foundation for subsequent operations.

After creating the base record, log tailer 145 evaluates whether any secondary indexes are associated with the table being updated (step 520). If there are secondary indexes, log tailer 145 generates corresponding index records for each index and buffers them locally (step 525) in memory buffer 170. This step may enable the updates to the base record and its associated indexes to be handled cohesively within the same transaction context.

Once the base record and any associated index records are buffered, then log tailer 145 prepares a batch (step 530) for transmission to log owner 140. This batching step consolidates all records related to the record write into a single RPC for efficient communication. Log tailer 145 then sends the batch to log owner 140 in a single RPC (step 555). In some embodiments, log tailer 145 creates multiple batches (e.g., one per record write) and sends them together in an RPC to log owner 140. If additional rows remain to be processed for the database statement (step 545), then the process loops back to step 515 to handle subsequent rows within the same database statement. If no further rows exist, the statement processing phase ends (step 550), marking the conclusion of batching records for the database statement.

The sent batch leads to a batch insertion process (steps 560, 565, 570, and 575) at log owner 140. Upon receiving the batch, log owner 140 initiates the batch processing sequence (step 560). This process involves checking for records within the batch (step 565). If the batch contains unprocessed records, then log owner 140 inserts a record from the batch into its local memory structure 160 (step 570) and logs the write to transaction log 120. The process then returns to step 565 to check for another unprocessed record in the batch. If no further records exist, then the batch insertion process concludes (step 575).

FIG. 5 illustrates an improvement over other approaches that involve sending separate RPCs for each base record and its associated index records. By consolidating these operations into a single batch, the system reduces network latency and enhances scalability, particularly in scenarios involving complex workloads with multiple secondary indexes.

Figure 6:
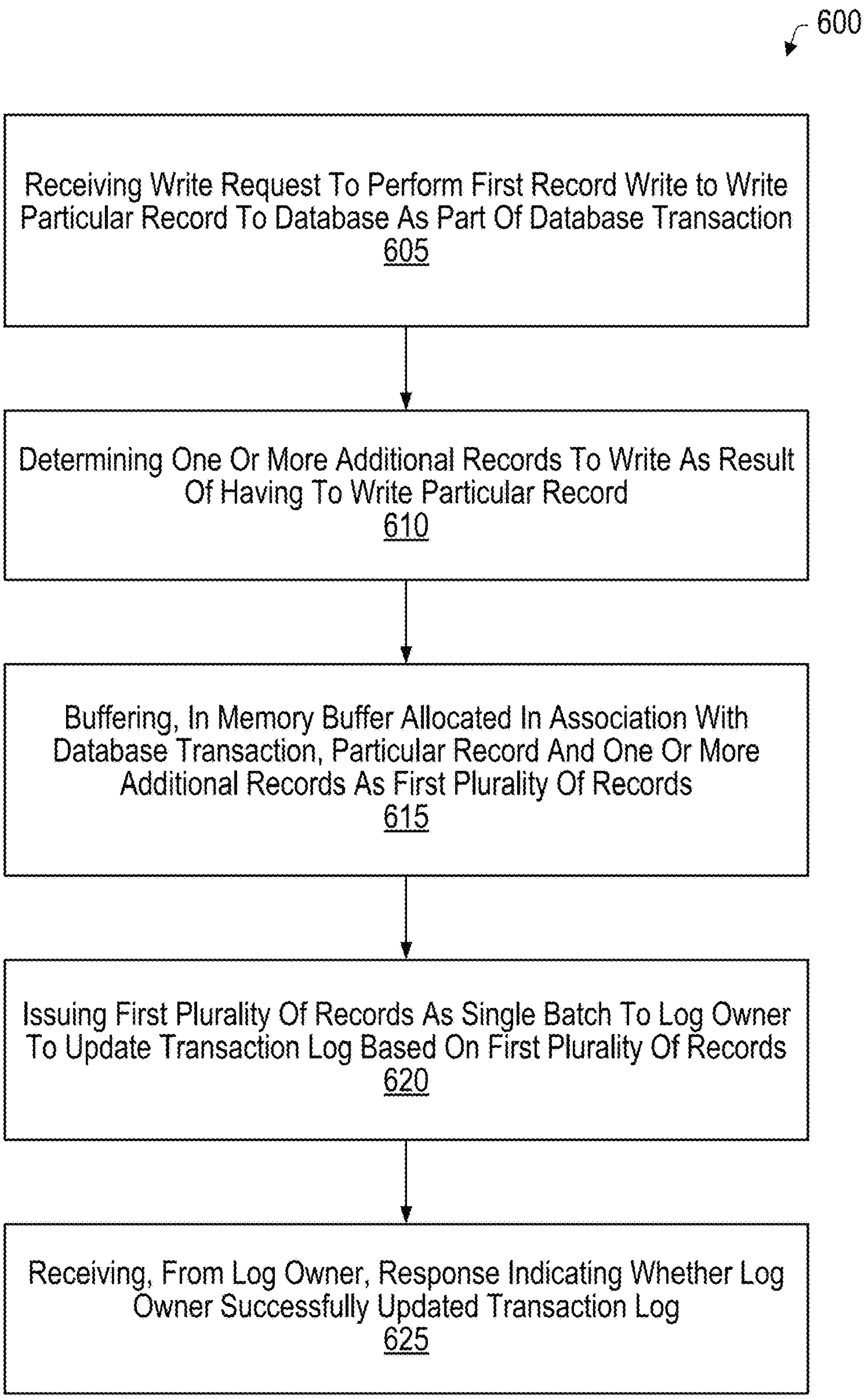
FIG. 6 is a flow diagram illustrating an example method that pertains to batching records to the log owner for a record write.

FIG. 6 is a flow diagram of one embodiment of a method 600 that pertains to batching records (e.g., records 130) to a log owner (e.g., log owner 140) for a record write. Method 600 is performed by a log tailer (e.g., log tailer 145) implemented by a computer system. Method 600 may be performed by executing program instructions stored on a non-transitory computer-readable medium. Method 600 may include more or fewer steps than shown. As an example, method 600 may include a step in which the log tailer inserts records into a memory structure/an in-memory cache (e.g., memory structure 160) of the computer system. Method 600 may further include a step in which the log tailer replays database operations logged in a transaction log (e.g., transaction log 120).

Method 600 begins in step 605 with the log tailer receiving a write request to perform a first record write to write a particular record to a database as a part of a database transaction (e.g., a transaction 155). In various embodiments, the log tailer is a part of a database system that includes a log owner and potentially one or more log tailers. The log owner may maintain a transaction log, and the log tailers may be secondary nodes to the log owner that replay the transaction log to recreate a state of the log owner. In various cases, the particular record is a base record of a database table—the particular record may update a row in the table.

In step 610, the log tailer determines one or more additional records to write as a result of having to write the particular record. The one or more additional records may be determined based on dependencies associated with the particular record. For example, one or more indexes may be built on the database table and thus writing the particular record may result in updates to the indexes. As such, the one or more additional records may correspond to the updates. In some cases, writing the particular record may result in a database trigger being executed. The execution of that database trigger may result in updates to one or more database objects (e.g., database tables, indexes, etc.). As such, the one or more additional records may correspond to the updates to those database objects. Also, in various embodiments, the log tailer implements an executor layer (e.g., executor layer 210) that determines the one or more additional records to write for the first record write and issues, for each of the additional records, a request to an access layer (e.g., access layer 220) of the log tailer to issue that record to the log owner.

In step 615, the log tailer buffers, in a memory buffer (e.g., memory buffer 170) allocated in association with the database transaction, the particular record and the one or more additional records as a first plurality of records. In some embodiments, the log tailer allocates, as a part of processing the first record write (e.g., in response to initiating the processing of the first record write), the memory buffer specifically for the first record write. Accordingly, the log tailer may deallocate the memory buffer after completion of the first record write. In some embodiments, the log tailer allocates the memory buffer for storing records generated as a part of processing the database transaction (or a database statement of the transaction). The memory buffer may thus be used to store a second plurality of records for a second record write, which may occur after completion of the first record write. In various embodiments, the access layer buffers the particular record and the one or more additional records in the memory buffer and issues the first plurality of records as the single batch (e.g., a batch 138) to the log owner. The second plurality of records may be issued as another single batch to the log owner.

In step 620, the log tailer issues the first plurality of records as a single batch to the log owner to update the transaction log based on the first plurality of records (or based on the first record write-log the first record write in the transaction log). In various embodiments, the executor layer communicates to the access layer when the first record write has started and has completed. Accordingly, the access layer may issue the first plurality of records as the single batch in response to receiving an indication from the executor layer that the first record write is complete. The batch may be sent in a single RPC to the log owner. Upon receiving the batch, the log owner may process it, including updating the transaction log with the appropriate log records (e.g., log record 125) and storing the first plurality of records in a memory structure (e.g., memory structure 160) of the log owner.

In step 625, the log tailer receives, from the log owner, a response indicating whether the log owner successfully updated the transaction log based on the first plurality of records. The response may be sent to the access layer of the log tailer, and the access layer may report the outcome to the executor layer of the log tailer. In various cases, the response indicates that the log owner successfully updated the transaction log. The log tailer may access, from the log owner, a particular set of records associated with one or more database objects (e.g., indexes) that were affected by the first record write—e.g., the log tailer may request index records from one or more indexes that were updated via the additional records. The particular set of records includes one or more of the first plurality of records (e.g., one or more of the additional records, which may be index records). The log tailer may determine whether the particular set of records includes two or more records having a same key or value that results in a uniqueness violation (e.g., are there multiple index records that violate a uniqueness constraint placed on a particular index?). As such, the log tailer may determine whether the first plurality of records resulted in one or more duplicate results being stored in the database.

In various embodiments, the log tailer inserts the first plurality of records into a local in-memory cache (e.g., memory structure 160) after the log owner has committed the database transaction—the first plurality of records may be inserted as a part of replaying the transaction log. The in-memory cache is distinct from the memory buffer, and the first plurality of records may become accessible to other database transactions after being inserted into the in-memory cache. In various cases, the log tailer receives a write request to perform a second record write to write a different particular record as a part of the database transaction. The log tailer may buffer, in the memory buffer, the different particular record and one or more additional records of the second record write as a second plurality of records. The second plurality of records may be issued in the single batch to the log owner.

Exemplary Computer System

Figure 7:
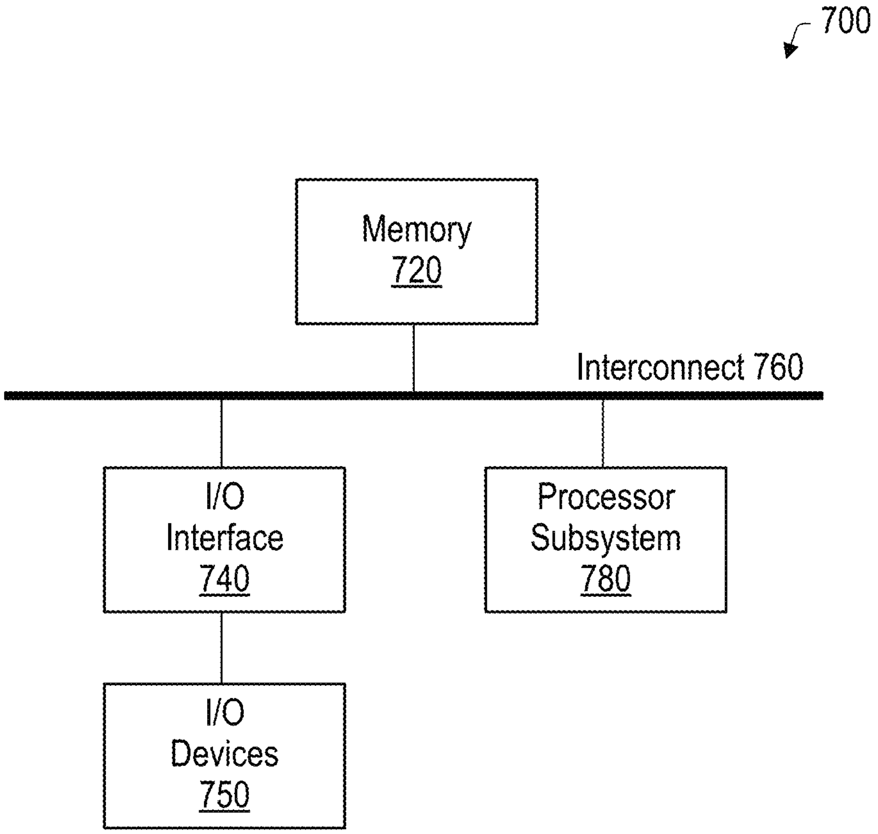
FIG. 7 is a block diagram illustrating elements of a computer system for implementing various systems described in the present disclosure, according to some embodiments.

Turning now to FIG. 7, a block diagram of an exemplary computer system 700, which may implement system 100, database store 110, log owner 140, and/or log tailer 145, is shown. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Although a single computer system 700 is shown for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable store program instructions executable by processor subsystem 780 to cause system 700 perform various operations described herein. System memory 720 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780. In some embodiments, program instructions that when executed implement database store 110, log owner 140, log tailer 145, memory buffer 170, database application 150, and/or memory structure 160 may be stored within system memory 720.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over WiFi, Bluetooth, Ethernet, etc.).

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:

receiving, by a log tailer of a database system, a write request to perform a first write to write a base record to a database table of a database as part of a database transaction, wherein the database system includes 1) a log owner that maintains a transaction log and 2) the log tailer that replays the transaction log to recreate a state of the log owner;

generating, by the log tailer, one or more additional records to write as a result of having to write the base record, wherein the one or more additional records include a set of updates to a set of indexes built on the database table;

buffering, by the log tailer in a memory buffer allocated in association with the database transaction, the base record and the one or more additional records as a first plurality of records;

issuing, by the log tailer, the first plurality of records as a single batch to the log owner via a single network request to update the transaction log based on the first plurality of records; and receiving, by the log tailer from the log owner, a response indicating whether the log owner successfully updated the transaction log based on the first plurality of records.

2. The method of claim 1, further comprising:

as a part of processing the first write, the log tailer allocating the memory buffer specifically for the first write; and upon completion of the first write, the log tailer deallocating the memory buffer.

3. The method of claim 1, further comprising:

allocating, by the log tailer, the memory buffer for storing records generated as a part of processing the database transaction, wherein the memory buffer is reused to store a second plurality of records for a second write after completion of the first write.

4. The method of claim 1, further comprising:

implementing, by the log tailer, an executor layer and an access layer, wherein the executor layer is operable to determine the one or more additional records to write for the first write and issue, for each of the one or more additional records, a request to the access layer to issue that record to the log owner, and wherein the access layer is operable to buffer the base record and the one or more additional records in the memory buffer and issue the first plurality of records as the single batch to the log owner.

5. The method of claim 4, wherein the executor layer is operable to communicate to the access layer when the first write has started and has completed, and wherein the access layer is operable to issue the first plurality of records as the single batch in response to receiving an indication from the executor layer that the first write is complete.

6. The method of claim 1, wherein the response indicates that the log owner successfully updated the transaction log, and the method further comprises:

accessing, by the log tailer and from the log owner, a particular set of records associated with one or more database objects affected by the first write, wherein the particular set of records includes one or more of the first plurality of records; and determining, by the log tailer, whether the particular set of records includes two or more records having a same key that results in a uniqueness violation.

7. The method of claim 1, further comprising:

inserting, by the log tailer, the first plurality of records into an in-memory cache of the log tailer as a part of replaying the transaction log, wherein the in-memory cache is distinct from the memory buffer, and wherein the first plurality of records becomes accessible to other database transactions after being inserted into the in-memory cache.

8. The method of claim 1, further comprising:

receiving, by the log tailer, a write request to perform a second write to write a different base record as a part of the database transaction; and buffering, by the log tailer in the memory buffer, the different base record and one or more additional records of the second write as a second plurality of records, wherein the second plurality of records is issued in the single batch to the log owner.

9. A non-transitory computer-readable medium having program instructions stored thereon that are capable of causing a computer system to implement a log tailer that performs operations comprising:

receiving, by the log tailer, a write request to perform a first write to write a base record to a database table of a database as part of a database transaction;

generating, by the log tailer, one or more additional records to write based on dependencies associated with the base record, wherein the one or more additional records include a set of updates to a set of indexes built on the database table;

buffering, by the log tailer in a memory buffer allocated in association with the database transaction, the base record and the one or more additional records as a first plurality of records;

issuing, from the log tailer to a log owner of a database system that includes the log tailer, the first plurality of records as a single batch to the log owner via a single network request to update a transaction log based on the first write and insert the first plurality of records into a memory structure of the log owner; and receiving, by the log tailer from the log owner, a response indicating whether the log owner successfully updated the transaction log and inserted the first plurality of records.

10. The non-transitory computer-readable medium of claim 9, wherein the operations further comprise:

in response to initiating a processing of the first write, allocating the memory buffer specifically for the first write; and deallocating the memory buffer after completion of the first write.

11. The non-transitory computer-readable medium of claim 9, wherein the operations further comprise:

allocating the memory buffer for storing records generated as a part of processing the database transaction;

storing, in the memory buffer, a second plurality of records for a second write, wherein the second plurality of records is sent as another single batch to the log owner; and deallocating the memory buffer after completion of all writes of the database transaction.

12. The non-transitory computer-readable medium of claim 9, wherein the response indicates that the log owner successfully updated the transaction log, and the operations further comprise:

accessing, from the log owner, a particular set of records associated with the set of indexes affected by the first write, wherein the particular set of records includes one or more of the first plurality of records; and determining whether the particular set of records includes two or more records having a same value that results in a uniqueness violation.

13. The non-transitory computer-readable medium of claim 9, wherein the operations further comprise:

inserting the first plurality of records into an in-memory cache of the computer system as a part of replaying the transaction log, wherein the in-memory cache is distinct from the memory buffer, and wherein the first plurality of records become accessible to other database transactions after being committed in the in-memory cache.

14. A system, comprising:

at least one processor; and memory having program instructions stored thereon that are executable by the at least one processor to implement a log tailer that performs operations comprising:

replaying, by the log tailer, database operations logged in a transaction log that is managed by a log owner of a database system that includes the log tailer;

receiving, by the log tailer, a write request to perform a first write to write a base record to a database table of a database as part of a database transaction;

generating, by the log tailer, one or more additional records to write as a result of having to write the base record, wherein the one or more additional records include a set of updates to a set of indexes built on the database table;

buffering, by the log tailer, the base record and the one or more additional records in a memory buffer as a first plurality of records;

issuing, from the log tailer, the first plurality of records as a single batch to the log owner via a single network request to update the transaction log based on the first write; and receiving, by the log tailer from the log owner, a response indicating whether the transaction log was successfully updated.

15. The system of claim 14, wherein the operations further comprise:

as a part of processing the first write, allocating the memory buffer specifically for the first write; and deallocating the memory buffer upon completion of the first write.

16. The system of claim 14, wherein the operations further comprise:

allocating the memory buffer for storing records generated as a part of processing a database statement of the database transaction, wherein the memory buffer is used to store a second plurality of records for a second write.

17. The system of claim 14, wherein the operations further comprise:

based on the response indicating that the log owner successfully updated the transaction log, determining whether the first plurality of records resulted in one or more duplicate results being stored in the database.

* * * * *